Aug. 14, 1928.

R. S. SANFORD 1,681,014

BRAKE MECHANISM

Filed Nov. 10, 1927

INVENTOR
ROY S. SANFORD
BY
Burton & McConkey
ATTORNEYS.

Patented Aug. 14, 1928.

1,681,014

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

BRAKE MECHANISM.

Application filed November 10, 1927. Serial No. 232,253.

My invention relates to improvements in brake mechanism and particularly to an improved bearing member mounted upon a brake shoe and carrying thrust rollers to be engaged by the operating cam.

An object is to provide a form of bearing member lending rigidity to the shoe and the rollers, and preferably in the form of a bushing permanently secured in the web of the shoe. The rollers may be mounted on a pivot journaled in the bushing, but preferably they are mounted on the bushing itself and held axially by a bolt or the like passing through the bushing.

Other objects and advantages of my invention will more fully appear from the following description, appended claims and accompanying drawing, wherein:

Figure 1:
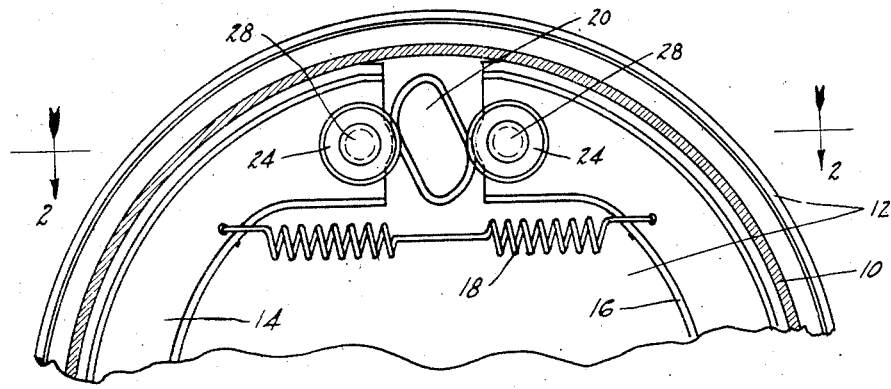
Figure 1 is a fragmentary elevation of a brake drum provided with brake shoes carrying rollers and embodying my invention.

In the drawing let 10 indicate a brake drum having a backing plate 12 and wherein is mounted a pair of brake shoes 14 and 16 held in constraint away from the drum by a spring 18. 20 indicates the operating cam supported upon a cam shaft 22. Each shoe is provided with a pair of bearing rollers 24 (Figure 2) or 124 (Figure 3) adapted to take the thrust of the cam.

Figure 2:
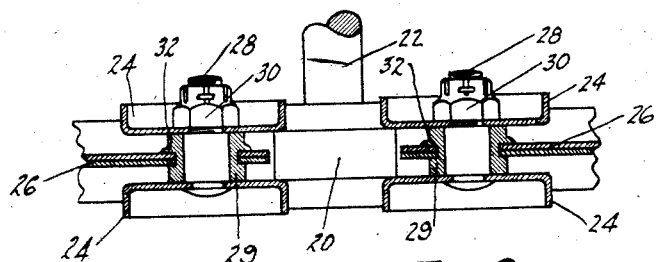
Figure 2 is a sectional view taken on line 2—2 of Figure 1.

These rollers 24 or 124 are here shown as formed or hollow sheet metal stampings. In the arrangement of Figure 2, the rollers are mounted on pivots 28 carried by bushings 29. One end of each pivot 28 may be riveted over on its roller 24, the other roller being held by a nut 30. The bushings 29 are permanently secured to the shoe, each being shown with a shoulder engaging one face of the shoe web 26, and with a flange 32 riveted or displaced against the opposite face of the shoe web 26.

Figure 3:
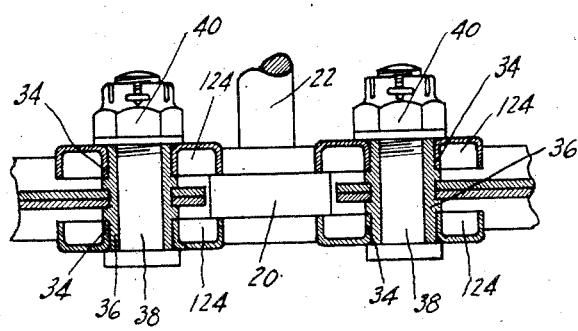
Figure 3 is a sectional view taken on the same line as Figure 2 through a modified form of construction.

In the arrangement of Figure 3, the rollers 124 are formed with central tubular bearing flanges 34, and the rollers are directly mounted on bushings 36 permanently secured in the shoe webs 26. A pin 38 passing through each bushing 36 has a head holding one of the rollers 124, the other roller being held by a nut 40 threaded on the pin against the end of bushing 36, the bushing thus preventing any binding of the rollers when the nut is tightened.

It will be seen that one roller of each shoe engages one side of the cam upon one side of an intermediate portion of greater diameter and the other roller of the pair engages the other side of the cam upon the other side of such intermediate portion of greatest diameter and that the cam itself serves to assist in spacing the rollers apart, and also acts through the rollers to hold the shoes against lateral movement.

What I claim is:

1. A brake shoe having a stiffening web provided with a bushing permanently secured in its web, in combination with rollers adjacent each end of the bushing, and a member passing through the bushing and co-operating with the bushing in holding the rollers.

2. A brake shoe having a stiffening web, a bushing permanently secured in said web and projecting at opposite sides of said web, rollers mounted on opposite ends of said bushing, and a device passing through the bushing and preventing axial movement of the rollers.

3. A brake shoe having a permanently mounted bushing projecting at its opposite sides, rollers mounted on opposite ends of said bushing, a pin passing through the bushing and having a head engaging one end of the bushing and holding one of the rollers, and a nut threaded on the opposite end of the pin and engaging the opposite end of the bushing and holding the other roller.

In testimony whereof, I, ROY S. SANFORD, sign this specification.

ROY S. SANFORD.